United States Patent [19]
Fukano et al.

[11] Patent Number: 5,918,810
[45] Date of Patent: Jul. 6, 1999

[54] SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/025,436

[22] Filed: Feb. 18, 1998

[30] Foreign Application Priority Data

Mar. 11, 1997 [JP] Japan ..................... 9-56717

[51] Int. Cl.$^6$ ............................... B05B 15/02
[52] U.S. Cl. .................. 239/119; 239/106; 222/571; 251/63.5; 251/331
[58] Field of Search .................... 239/104, 106, 239/119, 583, 586; 222/571; 251/63.5, 331

[56] References Cited

U.S. PATENT DOCUMENTS

| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,423,482 | 6/1995 | Mueller et al. | 239/119 X |

FOREIGN PATENT DOCUMENTS 8-10399  3/1996  Japan .

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A suck back valve is proposed which prevents displacement of a diaphragm due to pressure of a supply fluid, together with alleviating concern of changes in the amount of supply fluid which is to be sucked, and enabling ease of installation by making compact the system which employs the suck back valve. A diaphragm is displaced in the direction of arrow A under an activation operation of a linear voice coil type luffing device. Compressed air is introduced into a chamber, wherein the diaphragm is supported under an applied pressure. A coating liquid which is introduced through a fluid passage is supplied onto a semiconductor wafer from a nozzle. When an ON/OFF valve is activated and supply of the coating liquid is prevented, together with activating the linear voice coil luffing device and causing displacement of a plunger in the direction of arrow B, a poppet valve is displaced so that compressed air inside the chamber is output from a fluid output passage. Upon further displacement of the plunger the diaphragm is displaced, whereby the coating liquid is sucked, and any coating liquid in the nozzle is returned in the direction of arrow D.

7 Claims, 5 Drawing Sheets

SUCK BACK VALVE

BACKGROUND OF THE INVENTION

1. Field of the Invention

The present invention relates to a suck back valve which, for example, prevents liquid drip from occurring in a fluid supply port, by sucking back a fluid which flows through a fluid passage in accordance with a displacement action of a diaphragm, yet which is capable of stabilizing the suck back amount of the fluid.

2. Description of the Related Art

The suck back valve has been hitherto used, for example, in a production process for forming semiconductor wafers. The suck back valve has a function to prevent so-called liquid drip, i.e. a phenomenon in which a minute amount of coating liquid drips toward the semiconductor wafer from a supply port when the supply of coating liquid to the semiconductor wafer is stopped.

A suck back valve according to a conventional technique is shown by FIG. 5, further details of which may be seen, for example, in Japanese Utility Model Publication No. 8-10399.

The suck back valve 10 includes a main valve body 18 formed with a fluid passage 16 for making communication between a fluid-introducing port 12 and a fluid-discharging port 14, and a bonnet 20 coupled to an upper portion of the main valve body 18. A diaphragm 26, which comprises a thick-walled section 22 and a thin-walled section 24, is provided at a central portion of the fluid passage 16, wherein the overall surface of the thick-walled section 22 and thin-walled section 24 of the diaphragm is formed so as to face the fluid passage 16.

A piston 30 is fitted to the diaphragm 26, wherein a v-packing 32, which is slidable on an inner wall surface of the main valve body 18 and which functions as a seal, is installed on the piston 30. Further, a spring 34, which constantly presses the piston upwardly, is provided in the main valve body 18. The bonnet 20 is formed with a pressurized air supply port 28, wherein the pressurized air supply port 28 is connected to a pressurized air supply source (not shown) through an unillustrated flow amount control valve or the like. Reference numeral 36 indicates a screw member which abuts against the piston 30 to adjust the displacement amount of the piston 30, wherein the flow amount of a coating liquid sucked by the diaphragm 26 can be adjusted.

Operation of the suck back valve 10 shall now be explained in outline. In an ordinary state in which a coating liquid is supplied from the fluid-introducing port 12 to the fluid-discharging port 14, the flow amount control valve or the like is controlled, wherein pressurized air is supplied to the pressurized air supply port 28 from the pressurized air supply source. As a result, the piston 30 is displaced downwardly in accordance with the pressure of the pressurized air, and the diaphragm 26 which is coupled to the piston 30 protrudes into the fluid passage 16, as shown in FIG. 5 by the two-dot chain lines.

When flow of coating liquid through fluid passage 16 is halted, the piston 30 and diaphragm 26 are raised in unison under the action of the elastic force exerted by the spring 34, by controlling the flow amount control valve, or the like, and stopping the supply of pressurized air supplied to the pressurized air supply port 28 from the pressurized air supply source. Along with controlling such displacement by abutment of an end of an adjustment screw 36, a predetermined amount of coating liquid remaining in the fluid passage 16 is sucked under action of a negative pressure produced by the diaphragm 26. Thus, dripping of coating liquid, which would otherwise be caused at a fluid supply port connected to the fluid-discharging port 14 is prevented.

Notwithstanding, with the conventional suck back valve described above, a flow control valve, or the like, is needed for controlling the flow amount of pressurized fluid supplied to the pressurized air supply port 28, and piping operations for connecting the suck back valve 10 and the flow control valve introduce complications. Further, there is a disadvantage that a dedicated space for the system which employs the suck back valve is enlarged. Further, pressurized air supplied to the pressurized air supply port 28 is controlled by the flow control valve, and in order to cause movement of the piston 30 and displacement of the diaphragm 26 by pressure of the pressurized air, time is required from initiating control of the flow control valve until displacement of the diaphragm actually occurs, lengthening the response speed of the diaphragm 26. As a result, there is the concern that a delay occurs in the operation from halting supply of the coating liquid until the coating liquid is sucked back, and that more than a desired amount of coating liquid drips onto the semiconductor wafer.

A structure has been contemplated in which, in order to hasten the response speed of the diaphragm 28, the diaphragm 28 is forcibly displaced using an unillustrated electric actuator. However, in the case that applied power to the electric actuator is small, when the actuator is activated and the diaphragm 26 is displaced toward the interior of the fluid passage 16, the diaphragm is also pressed by the pressure of the coating liquid introduced to the inside of the fluid passage 16, and the diaphragm remains depressed in a direction opposite to that of the applied force from the electric actuator. Moreover, when supply of the coating liquid is halted, the diaphragm 26 is displaced and the coating liquid inside the fluid passage 16 is sucked, however, because the diaphragm is already in a condition of displacement, the coating liquid cannot be sufficiently sucked and there is the concern that coating liquid will drip onto the semiconductor wafer. Further, in order to prevent this type of problem, a large scale electric actuator which generates a large force is required, and as a result, there is the disadvantage that the suck back valve itself becomes large in scale.

In addition, in order to displace the diaphragm 26 by the compressed air supplied to the pressurized air supply port 28, when the pressure of the pressurized air supplied from the pressurized air supply source varies, the piston displacement amount is changed, and the coating liquid amount which is sucked by the diaphragm also changes. As a result, when supply of the coating liquid is halted, coating liquid remaining inside the fluid passage 16 is not sufficiently sucked, and unwanted coating liquid drips onto the semiconductor wafer. On the other hand, if the amount of sucked coating liquid becomes greater than desired, at the start of supply of the coating liquid, there is a problem that time is required until the coating liquid begins to drip onto the wafer.

SUMMARY OF THE INVENTION

A general object of the present invention is to provide a suck back valve in which the response speed of a diaphragm is improved by displacement of the diaphragm by an electric actuator, yet wherein the suck back valve is still small in scale.

A main object of the present invention is to provide a suck back valve in which a diaphragm is displaced by an electric actuator sucking a first fluid, together with introducing a second fluid into a diaphragm displacement chamber. As a result of supporting under pressure the diaphragm by a pressure of the second fluid, displacement of the diaphragm by pressure of the first fluid is prevented, enabling stabilization of the fluid amount of the sucked first fluid.

A further object of the present invention is to provide a suck back valve in which the suck back valve and an ON/OFF valve are integrally constructed, enabling system to be kept small in scale and thereby facilitating its installation.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
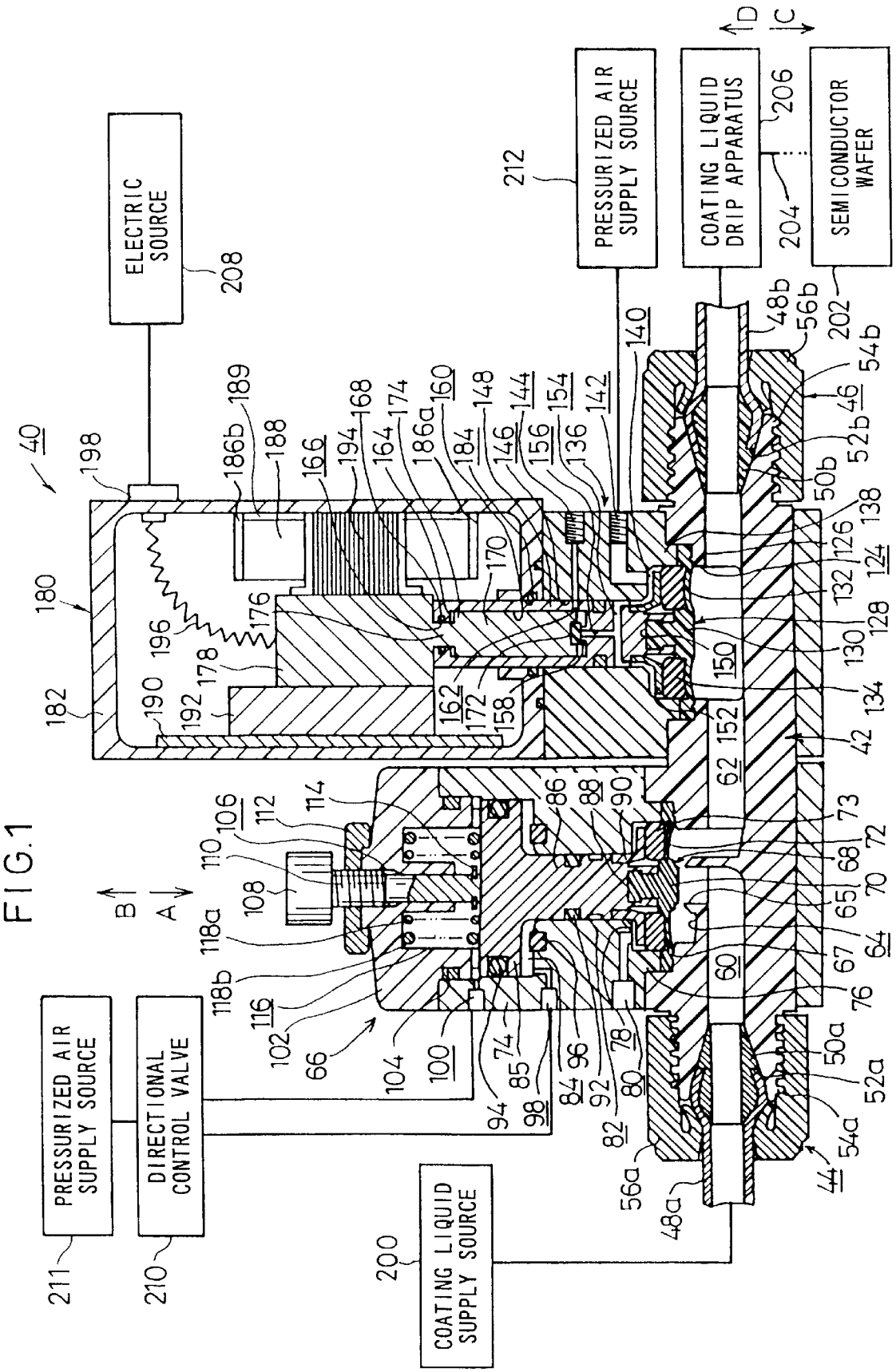
FIG. 1 is a vertical cross-sectional view illustrating a suck back valve according to an embodiment of the present invention.

In FIG. 1, reference numeral 40 shows the suck back valve according to an embodiment of the present invention. The suck back valve 40 comprises a longitudinally dimensioned valve body 42, having a first port 44 formed on one end side of the valve body 42, and a second port 46 formed on the other end side. Connecting elements 50a, 50b, coupled to ends of tubes 48a, 48b, are disposed in respective ports 44, 46, wherein the ends of tubes 48a, 48b are coupled to steps 52a, 52b formed on the outer circumference of the connecting elements 50a, 50b, thereby determining the position of the tubes 48a, 48b. Male screw threads 54a, 54b are engraved respectively on both ends of the valve body 42, wherein lock nuts 56a, 56b are threaded onto the male screws 54a, 54b, thereby press-fitting the tubes 48a, 48b onto the connecting elements 50a, 50b.

Inside the body 42, a fluid passage 60 communicating with one of the tubes 48a, and a fluid passage 62 communicating with the other tube 48b, are defined. The respective fluid passages 60, 62, as shown in FIG. 1, are curved upwardly in the interior of the valve body 42, communicating with a cavity 64 defined in the valve body 42, and a valve seat 65 is formed at a location adjacent the cavity 64. A step 67 is also formed on a wall of the cavity 64.

The cavity 64 communicates with fluid passages 60 and 62, and is blocked by an ON/OFF valve 66, the ON/OFF valve being equipped with a diaphragm 68 which is in contact with the step 67. A thick-walled portion 70 is formed at a central part of the diaphragm 68, and a flexible thin-walled portion 72 is formed around the periphery of the thick-walled portion 70. The diaphragm 68 is disposed for displacement in directions shown by arrows A and B, such that when the thick-walled portion 70 is displaced in the direction of arrow A, the thick-walled portion 70 is seated on the seat 65, interrupting communication between the fluid passage 60 and the fluid passage 62. On the other hand, when the thick-walled portion 70 is displaced in the direction of arrow B, communication is established between the fluid passage 60 and the fluid passage 62. The upper surface of the thin-walled portion 72 is coupled to an annular shaped elastic material 73 formed, for example, by a synthetic rubber, natural rubber or the like.

The ON/OFF valve 66 includes a body 74, wherein a lower part of the body 74 is formed with a protrusion 76 which fits into the cavity 64 such that the diaphragm 68 is sandwiched between the protrusion 76 and the step 67. A cavity 78 is also formed on the lower part of the body 74, wherein the cavity 78 communicates with an outer part of the body 74 through a passage 80. When the diaphragm 68 is displaced in the directions of arrow A and arrow B, air is introduced, through passage 80, into the interior of the recess 78, as well as discharged therefrom. The cavity 78 communicates with a hole 82 which extends along an axial line of the body 74, the hole 82 communicating with a further cavity 84 formed in an upper part of the body 74. A piston 86, formed with a flange 85 on an upper part thereof, is inserted so as to permit sliding thereof within the hole 82 and cavity 84, wherein an upper part of the thick-walled portion of the diaphragm 68 fits into a recess 88 formed on a lower part of the piston 86. A radially expanding trumpet-shaped support element 90 is affixed to lower outer peripheral surface of the piston 86, wherein the support element 90 contacts an upper surface of an elastic member 73. Because the thin-wall portion 72 of the diaphragm 68 and the elastic member 73 are ordinarily disposed in contact, a function for maintaining integrity of the thin-walled portion 72 is performed.

O-rings 92, 94 are disposed for preventing leakage of pressurized fluid at the outer periphery of the flange 85 and the piston 86. Further, a damper 96 is disposed at a bottom portion defined in the cavity 84. A passage 98 communicating with the bottom of cavity 84, and a passage 100 which communicates with an inner wall of the cavity 84, are defined in the body 74. A cover element 102 fitting into the cavity 84 is disposed at the top of the body 74, wherein a further O-ring 104 is disposed on the cover element 102 for preventing leakage of pressurized fluid from between the wall formed by the cavity 84. A screw hole 106 is defined in the center of the cover element 102, wherein an adjustment screw 110 having a gripping element 108 formed at one end thereof is threaded into the screw hole 106. The adjustment screw 110 is stopped at a fixed screw position by a lock nut 112, along with permitting variation (increasing/decreasing) of the amount at which the adjustment screw 110 is screwed in, thereby adjusting an abutment position of the other end of the adjustment screw 110 with respect to the piston 86, and regulating the displacement amount of the piston 86 in the direction of arrow B. A ring element 114 is disposed at the other end of the adjustment screw 110, wherein the adjustment screw 110 is prevented from being pulled out from the screw hole 106 by the ring element 114.

An annular cavity 116 which surrounds the adjustment screw 100 is defined in a lower part of the cover element 102, wherein ends of double-constructed (i.e. concentric) spring elements 118a, 188b are seated on a ceiling part defined in the annular cavity 116, and the other ends of the spring elements 118a, 118b are seated on an upper surface of the piston 86. Accordingly, the piston 86, under ordinary conditions, is biased under an applied force in the direction of arrow A, by the resiliency of spring elements 118a, 118b.

A hole 124 communicating with fluid passage 62 is formed at an upper part of the body 42, the hole 124 having a step 126 formed on a wall thereof. A diaphragm 128 is disposed on the step 126, the diaphragm 128 having a thick-walled portion 130 formed at the center thereof and a thin walled portion 132 formed around an outer circumference of the thick-walled portion 130. An annular elastic member 134 is disposed in contact with an upper surface of the thin-walled portion 132.

A support element 136 is disposed on an upper part of the valve body 42, the support element 136 having a projection 138 defined on a lower part thereof. An edge of the diaphragm 128 is sandwiched between the projection 138 and the step 126. A chamber 140 is defined by the support element 136, wherein the chamber communicates with a pressurized air supply source 212 (discussed later) through a fluid introduction passage 142 defined in the support element 136. A hole 146 is defined in the center of support element 136 communicating with the chamber 140. A fluid outlet passage 144 is defined along an inner wall of the hole 146, wherein the fluid outlet passage 144 communicates to an outer part of the support element 136 and is released to atmosphere. A grip 148 is slidably inserted in the hole 146, the grip 148 having a cavity 150 defined on a lower end thereof. Further, an upper part of the thick walled portion of the diaphragm 128 connects with the cavity 150, together with a radially expanding trumpet-shaped supporting element 152 which is affixed to a lower part of an outer circumferential surface of the grip 148. The supporting element 152 contacts an upper surface of the elastic member 134, performing a function for maintaining the elastic member against the thin-walled portion 132 of the diaphragm 128. As shown in FIG. 1, the grip 148 has a horizontally extending passage 154 defined therein, wherein both ends of the passage 154 bend downwardly communicating with the chamber 160. A passage 156 is defined inside the grip 148, which communicates with the passage 154, the passage 156 extending along the axial direction of the grip 148. Passage 156 further communicates with a chamber 160 defined inside the grip 148 extending along the axial direction thereof, with a seat 158 formed surrounding an opening of the passage 156. A further passage 162 is defined in the grip 148 which communicates with the chamber 160 and further penetrates from an inner wall to an outer wall thereof, and is constructed such that when the grip 148 is displaced to the position shown in FIG. 1, the passage 162 is made to communicate with the fluid outlet passage 144. An annular recess 166 is defined on an upper part of the grip 148 through step 164, wherein an O-ring 168 is disposed along a wall formed by the recess 166.

A plunger 170 is disposed for displacement along the directions of arrows A and B in the interior of chamber 160. A poppet valve 172, formed from an elastomeric material such as synthetic rubber or natural rubber, is disposed on a lower part of the plunger 170. Accordingly, when plunger 170 displaces in the direction of arrow A, the poppet valve 172 abuts with the seat 158 blocking passage 156. A step 174 which comes into contact with the step 164 is formed on an outer wall of the plunger 170. A reduced diameter part 176 which is inserted into hole 166 is formed on an upper part of the step 174, and a rectangular pole shaped support member 178 is formed on an upper part of the reduced diameter part 176.

On an upper part of the support member 136, an electric actuator comprising a linear voice coil type luffing device 180 is disposed. The linear voice coil type luffing device 180 includes a housing 182, with a hole 184 into which the grip 148 is inserted, defined on a lower part of the housing 182. A permanent magnet 188 is fixedly attached extending in the directions of arrows A and B, through a pair of support elements 186a, 186b, on one inner wall of the housing 182. An outer wall surface of the permanent magnet 188 and the inner wall surface of the housing 182 are supported at a fixed spacing from each other by support elements 186a, 186b, wherein a gap 189 is formed between the permanent magnet 188 and the housing 182. In the gap 189, a fixed magnetic field is generated from the permanent magnet 188 toward the inner wall surface of the housing 182. On the other side of the housing 182, a rail 190 is affixed, extending in the directions of arrows A and B, with a guide member 192 slidably disposed on the rail 190. The support member 178 is affixed to the guide member 192, and accordingly, when the guide member 192 is displaced in the directions of arrows A or B along rail 190, the plunger 170 is likewise displaced. An electromagnetic coil 194 is attached to the support member 178, wherein the electromagnetic coil 194 is constructed to surround the permanent magnet 188 and to be displaceable in directions of arrows A and B. Electrical wires forming the electromagnetic coil 194 extend along a direction perpendicular to a fixed magnetic filed generated by the permanent magnet 188 inside the gap 189. One end of a harness 196 is attached to the support member 178, wherein although not shown, the harness 196 is electrically connected to the electromagnetic coil 194. The harness may be formed in a spiral shape, and is flexible, wherein another end of the harness connects with a connector 198 on a wall of the housing 182.

The suck back valve 40 according to the embodiment of the invention is basically constructed as described above. Next, an explanation shall be given of the operation thereof.

First, a coating liquid supply source 200 storing therein a coating liquid, which makes up a first fluid with which the semiconductor wafer 202 is coated, is connected with a tube 48a communicating with the first port 44 of the suck back valve 40. On the other hand, a coating liquid drip apparatus 206, having disposed thereon a nozzle 204 from which the coating liquid is dripped onto the semiconductor wafer 202, is connected to a tube 48b communicating with the second port 46. In addition, a pressurized air supply source 211 is connected to passages 98 and 100 through a directional control valve 210, for supplying pressurized air which makes up a second fluid, and a further pressurized air supply source 212 is connected to the fluid inlet passage 142. Further, an electric source 208 is connected to the connector 198.

Then, by means of an energizing operation from the electric source 208, the electromagnetic coil 194 constructed as part of the linear voice coil type luffing device 180 is displaced integrally with the plunger 170 in the direction of arrow A. Accordingly, the grip 148 is pressed by the lower part of the support member 178 and is displaced in the direction of arrow A, and an end of the thick-walled portion 130 of diaphragm 128 is displaced toward the fluid passage 62. On the other hand, passage 156 is blocked by the poppet valve 172, and under this condition, when pressurized air is supplied from the pressurized air supply source 212, pressurized air is introduced into the chamber 140, whereby the diaphragm 128 is supported under pressure by the pressure of compressed air.

After such preliminary steps have been taken, as shown in FIG. 1, upon switching of the directional control valve 210 and introducing pressurized air from the pressurized air supply source 211 into cavity 84 through passage 98, the piston 86 is displaced in the direction of arrow B, while being opposed by the elastic force of spring elements 118a, 188b. The thick-walled portion 70 of the diaphragm 68 thus separates from the seat 65, so that fluid passages 60 and 62 are put in communication. When the coating liquid supply source is activated, coating liquid is supplied to the coating liquid drip apparatus 206 through fluid passages 60, 62 from one tube 48a, and is dripped onto the semiconductor wafer 202 through nozzle 204. As a result, a coating layer (not shown) having a desired thickness is formed on the semiconductor wafer 202. At this time, the coating liquid inside fluid passage 62 presses against the diaphragm 128 in the direction of arrow B. However, because the diaphragm 128 is supported under pressure by the pressurized air in chamber 140 supplied from the pressurized air supply source 212, there is no concern that the thick-walled portion 130 of the diaphragm 128 will actually be displaced in the direction of arrow B.

Figure 2:
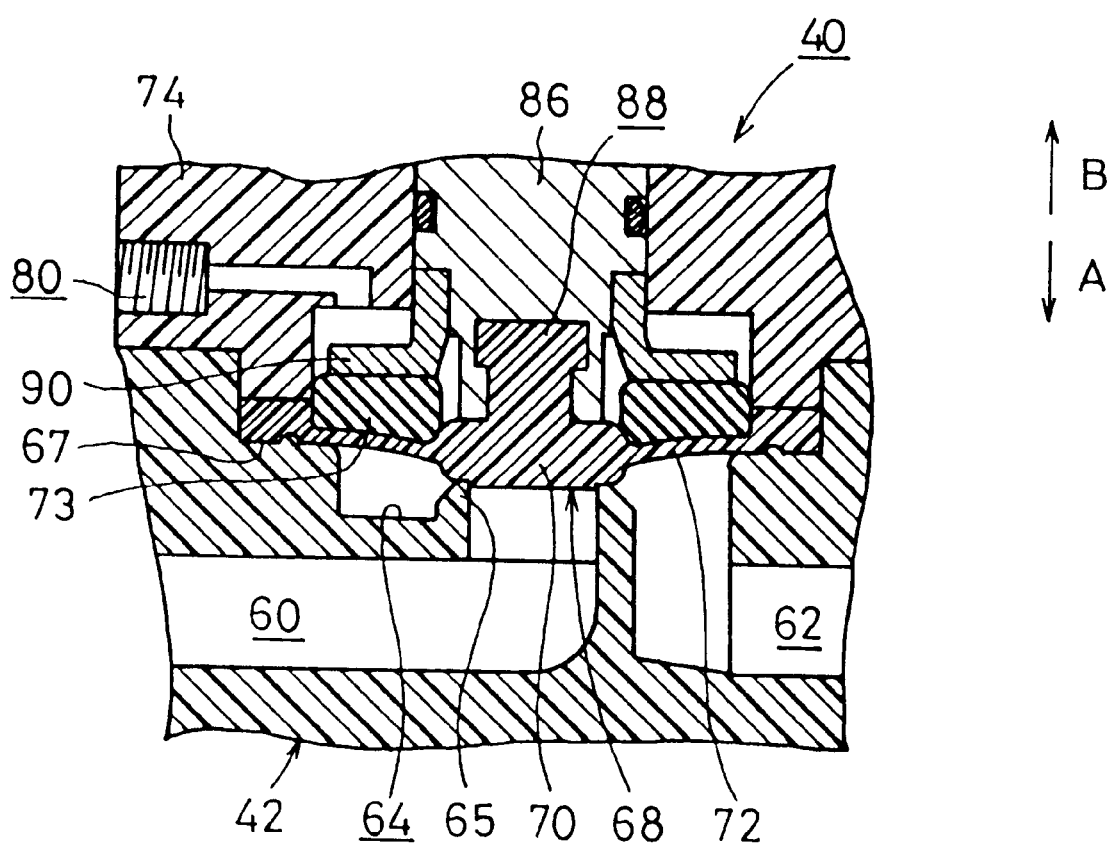
FIG. 2 is a partial enlarged vertical cross-sectional view showing a condition under use of the suck back valve of FIG. 1, and an blocked condition of an ON/OFF valve.

After a desired amount of coating liquid has been applied to the semiconductor wafer 202, the directional control valve is switched again, and as shown in FIG. 2, when pressurized air is introduced to passage 100 from the pressurized air supply source 212, the piston 86 displaces in the direction of arrow A, and the thick-walled section 70 of diaphragm 68 is displaced to be seated onto valve seat 65, whereby communication between the fluid passages 60 and 62 is interrupted. Thus, dripping of coating liquid onto the semiconductor wafer 202 from the nozzle 204 of the coating liquid drip apparatus 206 (refer to FIG. 1) is halted. In this case, because the coating liquid immediately preceding that which has dripped onto the semiconductor wafer remains inside the nozzle, there is a fear that unwanted dripping can occur.

Figure 3:
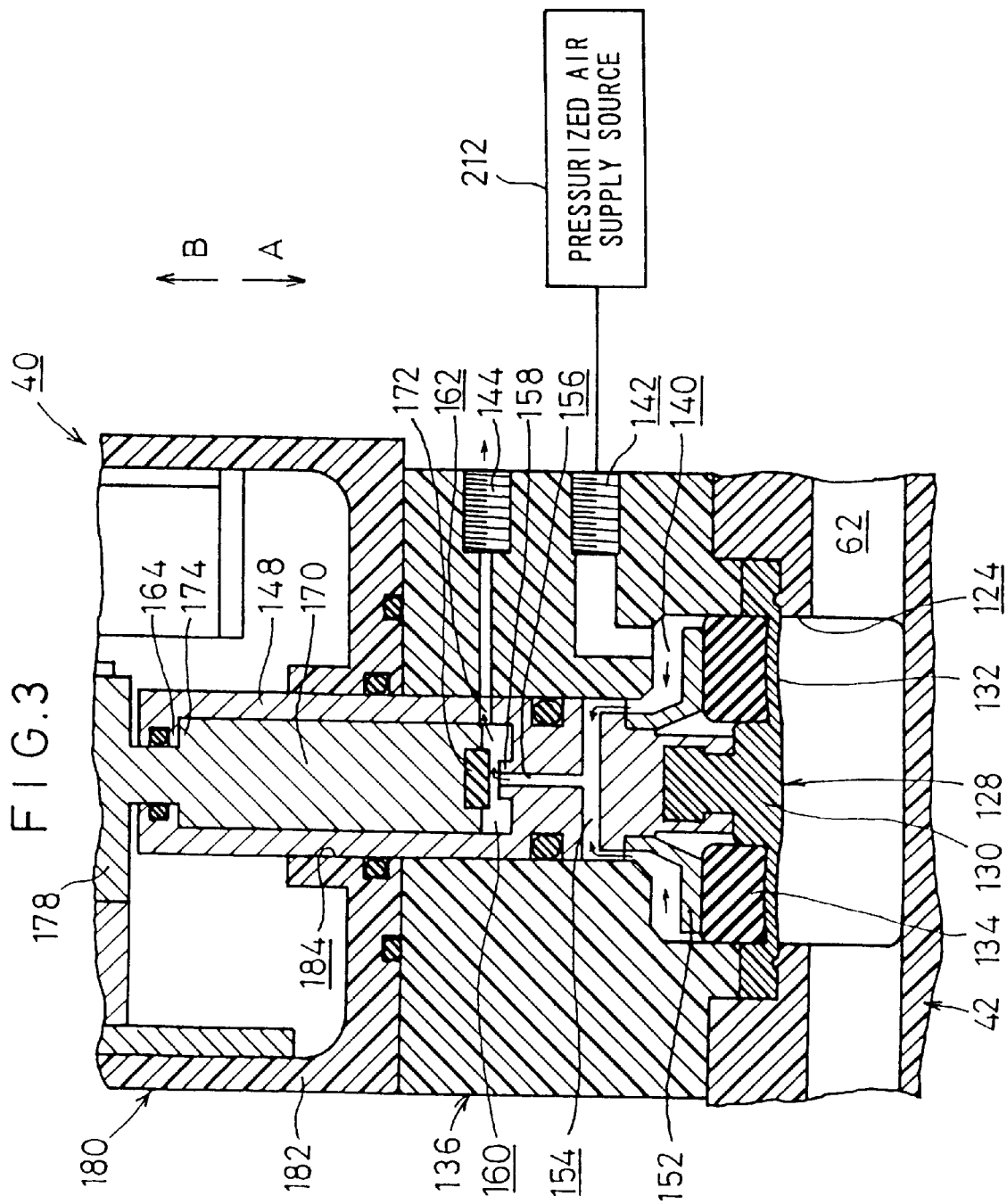
FIG. 3 is a partial enlarged vertical cross-sectional view showing a condition under use of the suck back valve of FIG. 1, and a displaced condition of a poppet valve .

Therefore, pressurized air supply source 212 is de-energized, halting supply of pressurized air into the chamber 140. Together therewith, when the electric source 208 is energized and a predetermined current is supplied to the electromagnetic coil 194, a flow of current develops in the electromagnetic coil 194 in a direction perpendicular to the fixed magnetic field generated within the gap 189 by the permanent magnet 188. As a result, a force in the direction of arrow B is generated in the electromagnetic coil 194 according to Flemming's left-hand rule. By appropriately adjusting the size and/or polarity of the current which energizes the electromagnetic coil 194, the force can be adjusted in terms of its desired direction, size and/or duration. When the electromagnetic coil 194 is displaced, as shown in FIG. 3, first the plunger 170 is displaced together with the electromagnetic coil 194 in the direction of arrow B, and the step 174 of the plunger 170 abuts against the step 164 of the grip 148. As a result, the poppet valve 172 separates from the seat 158, whereby passage 156 communicates with the fluid outlet passage 144 through passage 162. Thus, the pressurized air in chamber 140 is discharged to the outside from the fluid outlet passage 144, by way of mutually interconnected passages 154, 156 and 162. Accordingly, pressurized support of the diaphragm 128 by the pressurized air is released.

Figure 4:
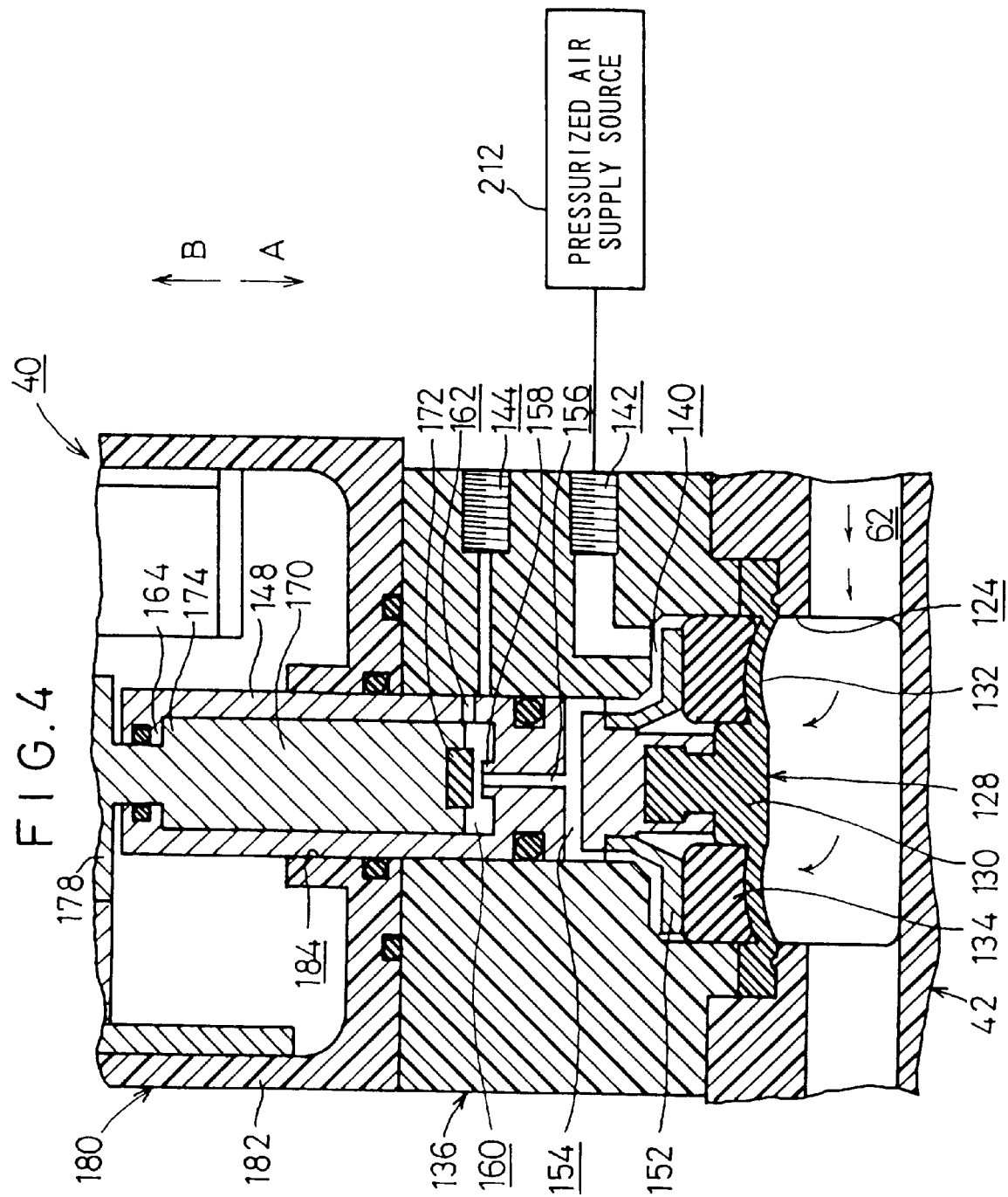
FIG. 4 is a partial enlarged vertical cross-sectional view showing a condition under use of the suck back valve of FIG. 1, and a displaced condition of a diaphragm.
Figure 5:
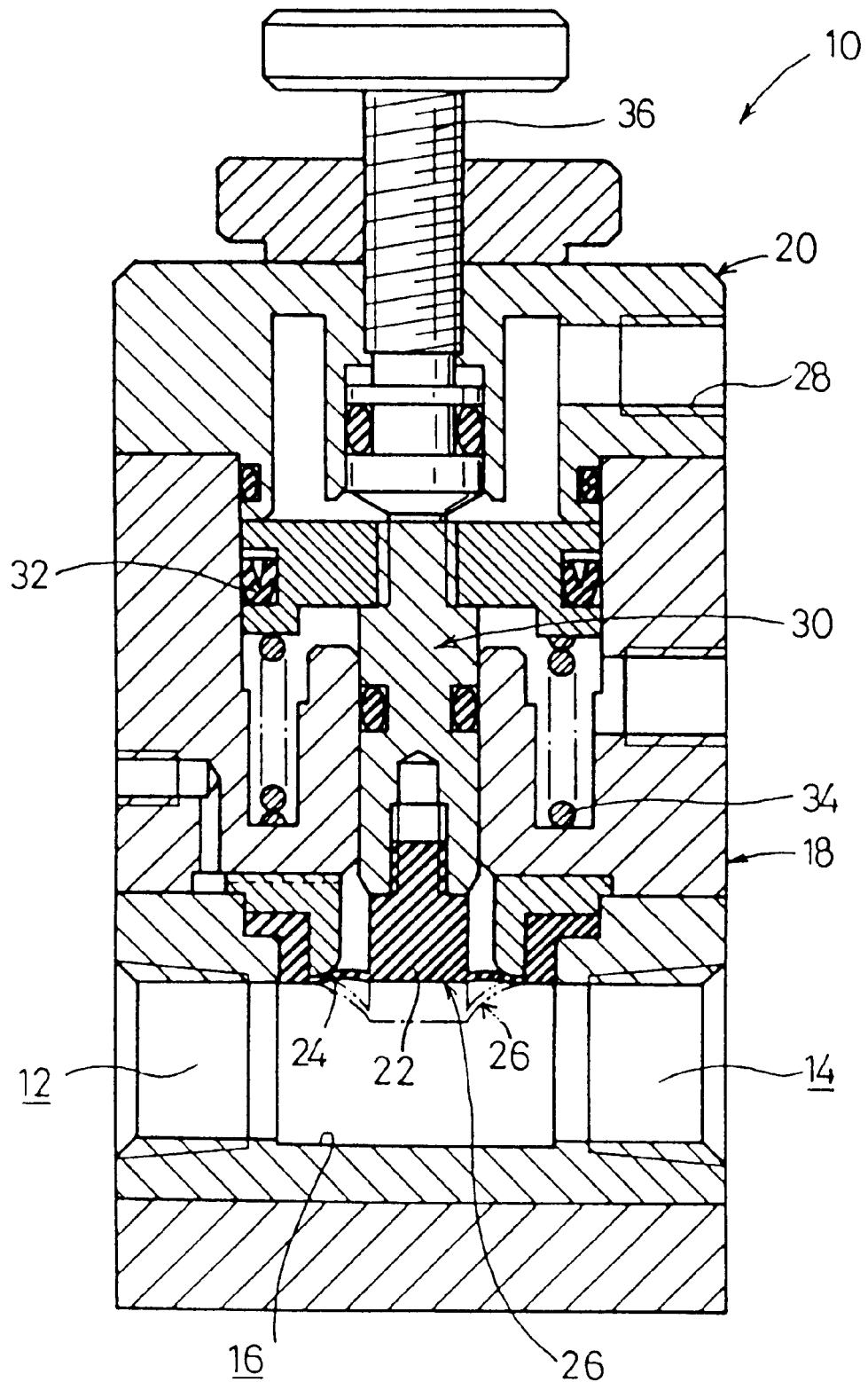
FIG. 5 is an outline vertical cross-sectional view of a suck back valve according to a conventional technique.

When the electromagnetic coil 194 is displaced further in the direction of arrow B, as shown in FIG. 4, step 174 on the plunger 170 and step 164 of the grip 148 come into contact, whereby the grip 148, the plunger 170 and the electromagnetic coil 194 are displaced together in unison. When this happens, the thin-walled portion 132 deforms so as to bend, the thick-walled portion 130 of the diaphragm 128 is displaced in the direction of arrow B, and a negative pressure develops in the fluid passage 62, whereby a desired amount of coating liquid inside the fluid passage 62 is sucked. As a result, the coating liquid inside the nozzle 204 of the coating liquid drip apparatus 206 is returned in the direction of arrow D, and therefore unwanted liquid dripping with respect to the semiconductor wafer 202 can be prevented (refer to FIG. 1).

In the event that coating liquid is again supplied to the semiconductor wafer 202, the directional control valve 210 is again switched and pressurized air is introduced to the passage 98, and the piston 86 causes integral displacement in the direction of arrow B of the thick-walled portion 70 of the diaphragm 68, establishing communication between fluid conduits 60 and 62. At this time, the electric source 208 is energized, causing displacement of the electromagnetic coil 194 in the direction of arrow A, while simultaneously pressurized air is introduced to the chamber 140 from the pressurized air supply source 212. Thus, as shown in FIG. 1, the thin-walled portion 132 of the diaphragm 128 deforms to become substantially flat, the thick-walled portion 130 is displaced integrally with the electromagnetic coil 194 in the direction of arrow A, and coating liquid is pushed out through passage 62. As a result, coating liquid which was returned in the direction of arrow D from the nozzle when dripping was prevented is now supplied in the direction of arrow C, and thereby coating liquid is swiftly dripped toward the semiconductor wafer 202 from the nozzle 204.

With the suck back valve 40 according to the embodiment of the invention, the following effects and advantages are attained.

Because the diaphragm 128 is forcibly displaced by an electrical control using a linear voice coil type luffing device 180, the diaphragm 128 response time is shortened, and the operations in the period between halting of supply of the coating liquid and sucking of the coating liquid can be swiftly performed. Further, because the diaphragm 128 is supported under pressure by compressed air introduced to the chamber 140, when coating liquid is supplied to the semiconductor wafer 202, displacement of the diaphragm 128 in the direction of arrow B by the coating liquid introduced into the fluid passage 62 can be prevented. Further, as the controls are electrical, the controls per se are reliable, and because compressed air introduced from the fluid inlet port 142 serves only for supporting under pressure the diaphragm 128, no effect is produced by pressure variations of the pressurized air supply source, and there is no concern that changes will occur with respect to the amount of coating liquid sucked by the suck back valve 40 when the diaphragm 128 is displaced. Accordingly, when supply of the coating liquid is halted, there is no dripping of coating liquid onto the semiconductor wafer 202, and furthermore, when supply of the coating liquid is started, because the time at which it takes the coating liquid to begin dripping onto the semiconductor wafer 202 is shortened, there is no fear that the desired amount of coating liquid will not be delivered to the semiconductor wafer 202.

Further, because the poppet valve 172 is actuated integrally with the diaphragm 128 by the linear voice coil type luffing device 180, thereby controlling communication and interruption of communication between the fluid inlet port 142 and the fluid outlet port 144, a flow amount control valve, or the like, for supplying pressurized air for supporting under pressure the diaphragm 128 becomes unnecessary. Compared to the conventional technique in which the diaphragm 26 is displaced by pressurized air, a supply pipe for connecting a flow control valve, or for interconnecting a flow control valve and the suck back valve 40 becomes unnecessary, so that a system using the suck back valve 40 can be constructed on a small scale. Moreover, the cost thereof can be kept inexpensive, and further, the time for installation of this type of apparatus can be shortened.

What is claimed is:

1. A suck back valve comprising:

a valve body having formed therein a first port and a second port, and having fluid passages communicating respectively with the first and second ports and through which a first fluid flows;

a diaphragm disposed in a chamber formed in said valve body, said diaphragm being displaceable toward an inner portion of said fluid passages;

an electric actuator for displacing said diaphragm; and a valve element disposed in said valve body and which is integrally displaced together with said diaphragm by said electric actuator, wherein a second fluid flows through said valve body, and further comprising a fluid inlet passage and a fluid outlet passage disposed in said valve body and separated from said fluid passages by said diaphragm, such that when said diaphragm is displaced toward an interior of said fluid passages under an actuating operation of said electric actuator, said second fluid is introduced to said chamber from said fluid inlet passage, and said diaphragm is thereby supported under pressure by the pressure of said second fluid, whereas when said diaphragm is displaced in an outward direction from said fluid passages under an activating operation of said electric actuator, said valve element is caused to be displaced making communication between said fluid inlet passage and said fluid outlet passage, and said second fluid introduced into said chamber is output from said fluid outlet passage.

2. The suck back valve according to claim 1, further comprising:

a substantially cylindrical grip connected to said diaphragm and having defined therein a passage which communicates with said chamber;

a plunger including thereon said valve element, said plunger movably disposed inside said grip and displaceable by activation of said electric actuator, wherein, when said plunger is displaced by activation of said electric actuator, said passage is opened or closed by said valve element.

3. The suck back valve according to claim 2, wherein said valve element comprises a poppet valve, said grip further comprising a seat formed on an opening of said passage onto which said poppet valve is seatable, wherein when said diaphragm is displaced toward said fluid passage by activation of said electric actuator, said poppet valve is seated on said seat, closing said passage and preventing discharge of said second fluid in said chamber, whereby said diaphragm is supported under a pressure of said second fluid.

4. The suck back valve according to claim 2, wherein said diaphragm is formed by a thick-walled portion attached to said grip and a thin-walled portion surrounding said thick-walled portion and being deformable by activation of said electric actuator, said thin-walled portion being supported by a support member disposed on said grip through an elastic member.

5. The suck back valve according to claim 1, wherein said actuator comprises a linear voice coil type luffing device.

6. The suck back valve according to claim 1, further comprising an ON/OFF valve disposed in said valve body for establishing and cutting-off communication between said first port and said second port.

7. The suck back valve according to claim 1, wherein said second fluid comprises compressed air.

\* \* \* \* \*